United States Patent [19]
Phillips et al.

[11] Patent Number: 6,088,497
[45] Date of Patent: Jul. 11, 2000

[54] APPARATUS AND METHOD FOR TAPPING OPTICAL TRANSMISSIONS FOR ANALYSIS OF OPTICAL PROTOCOLS

[75] Inventors: Wade Charles Phillips, Omaha, Nebr.; Richard Joseph Pimpinella, Hampton, N.J.

[73] Assignee: Lucent Technologies Inc., Murray Hill, N.J.

[21] Appl. No.: 09/163,944

[22] Filed: Sep. 30, 1998

[51] Int. Cl.[7] ..................................................... G02B 6/26
[52] U.S. Cl. ................................. 385/48; 385/16; 385/24; 385/134
[58] Field of Search .................................... 385/15, 16, 24, 385/39, 48, 134–139

[56] References Cited

U.S. PATENT DOCUMENTS

| | | | |
|---|---|---|---|
| 5,461,693 | 10/1995 | Pimpinella | 385/135 |
| 5,712,942 | 1/1998 | Jennings et al. | 385/134 |

Primary Examiner—Phan T. H. Palmer
Attorney, Agent, or Firm—Gibbons, Del Deo, Dolan, Griffinger & Vecchione

[57] ABSTRACT

A system and associated method for use in a fiber administration system that establishes optical communication links. The system includes an optical tap that is disposed in each optical fiber pathway contained within the optical communication links. The optical taps are contained within modules that can be selectively added or removed from a shelf casing that is sized to fit within the framework of the fiber administration system. An optical switch is present in each shelf casing that holds the tap modules. The optical switch is connected to each of the optical taps on its shelf and receives the tapped optical signal provided by the optical taps. An optical signal analyzer is provided within the framework of the fiber administration system. The optical signal analyzer is interconnected with the optical switches on each shelf that contains a tap module. The optical switches selectively interconnect the optical signal analyzer to any of the optical taps.

17 Claims, 3 Drawing Sheets

APPARATUS AND METHOD FOR TAPPING OPTICAL TRANSMISSIONS FOR ANALYSIS OF OPTICAL PROTOCOLS

BACKGROUND OF THE INVENTION

1. Field of the Invention

The present invention relates to devices and methods that connect an optical protocol analyzer to an optical communications link for the purpose of analyzing the optical protocol being transmitted through that optical link. More particularly, the present invention relates to devices and methods capable of analyzing the optical protocol of and optical signal in an optical communications link without causing disruption to the signal in that link.

2. Description of the Prior Art

There are many applications that utilize an optical fiber network to establish an optical communications link between a host digital terminal (HDT) at a central office and an optical network unit (ONU) at a remote location. Since a central office serves as the point of origin for the optical fibers in the optical fiber network, fiber administration systems are typically used at the central office to manage the flow of optical signals as they are directed to the various ONUs along the different optical fibers in the network.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein. In such fiber administration systems, the optical distribution frames used at the central office are typically large structures that are arranged in parallel rows. Each optical distribution frame is commonly mounted between the floor and ceiling and only a few feet separate each row of frames.

Each optical distribution frame located at the central office typically defines a plurality of bays, wherein each bay houses several fiber distribution shelves. On each of the fiber distribution shelves are connection modules that receive the ends of all of the individual optical fibers that enter the central office and are contained within the optical fiber network. By terminating each optical fiber at a connection module on one of the different fiber distribution shelves, the location of each optical fiber becomes known within the overall assembly. Once terminated at a known address on one of the fiber distribution shelves, each optical fiber can be selectively coupled to a HDT or a variety of other optical equipment located at the central office. As a result, the optical signals sent along each optical fiber can be selectively controlled.

In order to test or characterize the quality of an optical communication link, it is sometimes necessary to connect an optical protocol analyzer to the link and analyze the optical protocols of the signal traveling through that link. However, optical protocol analyzers are highly expensive. As a result, it is not desirable to dedicate an optical protocol analyzer to a specific optical communication link. It is also not desirable to disrupt optical communication links while an optical protocol analyzer is selectively introduced into the path of the optical communications link.

Even if various optical fibers terminate in an organized manner at fiber distribution shelves of an optical distribution frame, a significant amount of operator intervention is required to selectively connect an optical protocol analyzer to a specific optical communications link. The operation is far more complex and time consuming if the optical communications link is active and the connection of the optical protocol analyzer must be done without disruption of the link.

A need therefore exists for an apparatus and method that enables a single optical protocol analyzer to be selectively coupled to a plurality of communications links. In this manner a single optical protocol analyzer can be shared by numerous optical communication links.

A need also exists for an apparatus and method that simplifies the procedure of connecting an optical protocol analyzer to a communications link without disrupting the link.

SUMMARY OF THE INVENTION

The present invention is a system and associated method used to improve the monitoring and testing capabilities of a fiber administration system that has established optical communication links. The system includes an optical tap that is disposed in each optical fiber pathway contained within the optical communication links. The optical taps are contained within modules that can be selectively added or removed from a shelf casing sized to fit within the framework of the fiber administration system. An optical switch is present in each shelf casing that holds the tap modules. The optical switch is connected to each of the optical taps on its shelf and receives the tapped optical signal provided by the optical taps.

An optical signal analyzer is provided within the framework of the fiber administration system. The optical signal analyzer is interconnected with the optical switches on each shelf that contains a tap module. The optical switches selectively interconnect the optical signal analyzer to any of the optical taps. Accordingly, a single optical signal analyzer, or a few optical signal analyzers, can monitor a much larger number of optical communication links without disturbing those links.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION

Figure 1:
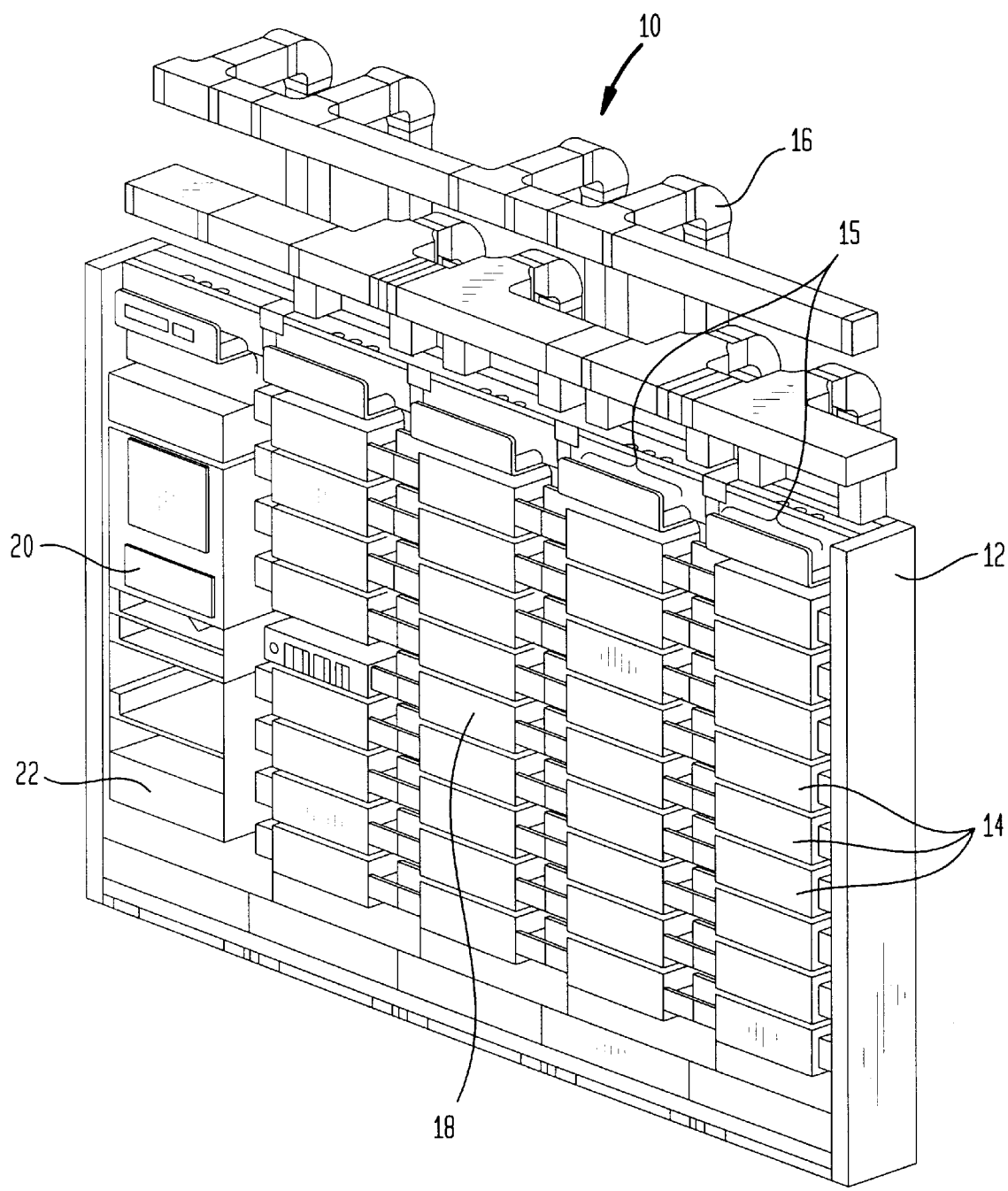
FIG. 1 is a perspective view of an optical fiber administration system containing a first plurality of bays and a second plurality of fiber distribution shelves in each bay.

In FIG. 1, a fiber administration system 10 that incorporates the present invention apparatus is shown. The exemplary fiber administration system 10 includes an optical fiber distribution frame 12 that is affixed in a set position at a central office. The fiber distribution frame 12 defines a plurality of bays 15. Each bay 15 is a vertical structure that supports a plurality of shelves. Among the various shelves are a plurality of fiber distribution shelves 14 and at least one tap module shelf 18. At least one optical protocol analyzer 22 is also contained within the framework of the optical fiber administration system 10. The overall fiber administration system 10 is controlled by a programmable central controller 20 that runs the operating software for the system 10.

The optical fibers at the various fiber distribution shelves 14 are interconnected to create a multitude of different optical communication links. As is later explained, the optical protocol analyzer 22 is interconnected to a plurality of different optical communication links via the tap module shelf 18. As such, an optical protocol analyzer 22 can be used to selectively test and monitor any of the optical communication links to which it is interconnected.

Figure 2:
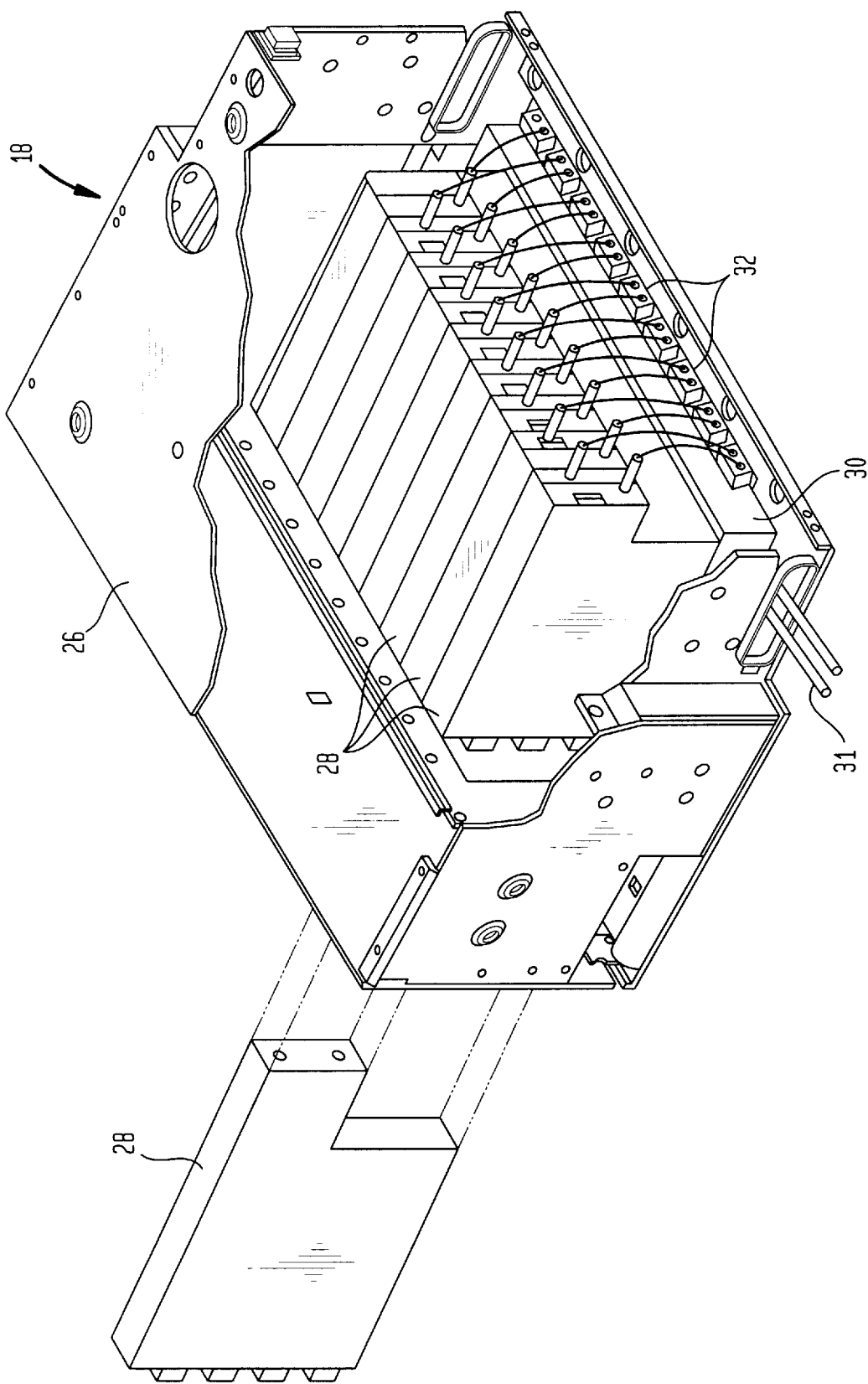
FIG. 2 is partially fragmented rear perspective of a shelf casing that contains tap modules and an optical switch.

Referring to FIG. 2, the tap module shelf 18 is shown. The tap module shelf 18 contains shelf casing 26. The shelf casing is sized to fit within the bays 15 (FIG. 1) of the fiber administration system 10 (FIG. 1). A rack of optical tap modules 28 is positioned within the shelf casing 26. The optical tap modules 28 each contain a plurality of optical connectors 30 that enable the modules 28 to be connected into the optical communications path between the HDT at the central office and a remote ONU. As a result, any optical communications link between the HDT and an ONU will pass through one of the optical tap modules 28.

An optical switch 30 is also contained within the shelf casing 26. The optical switch 30 has two input ports that connect to the optical protocol analyzer (not shown), via a set of optical leads 31. The optical switch 30 also contains a plurality of output ports 32 that connect to the various optical tap modules 28. As will later be explained, the optical switch 30 selectively interconnects the optical protocol analyzer to the various optical tap modules 28 and the optical communications link in which path the optical tap modules 28 are placed.

Figure 3:
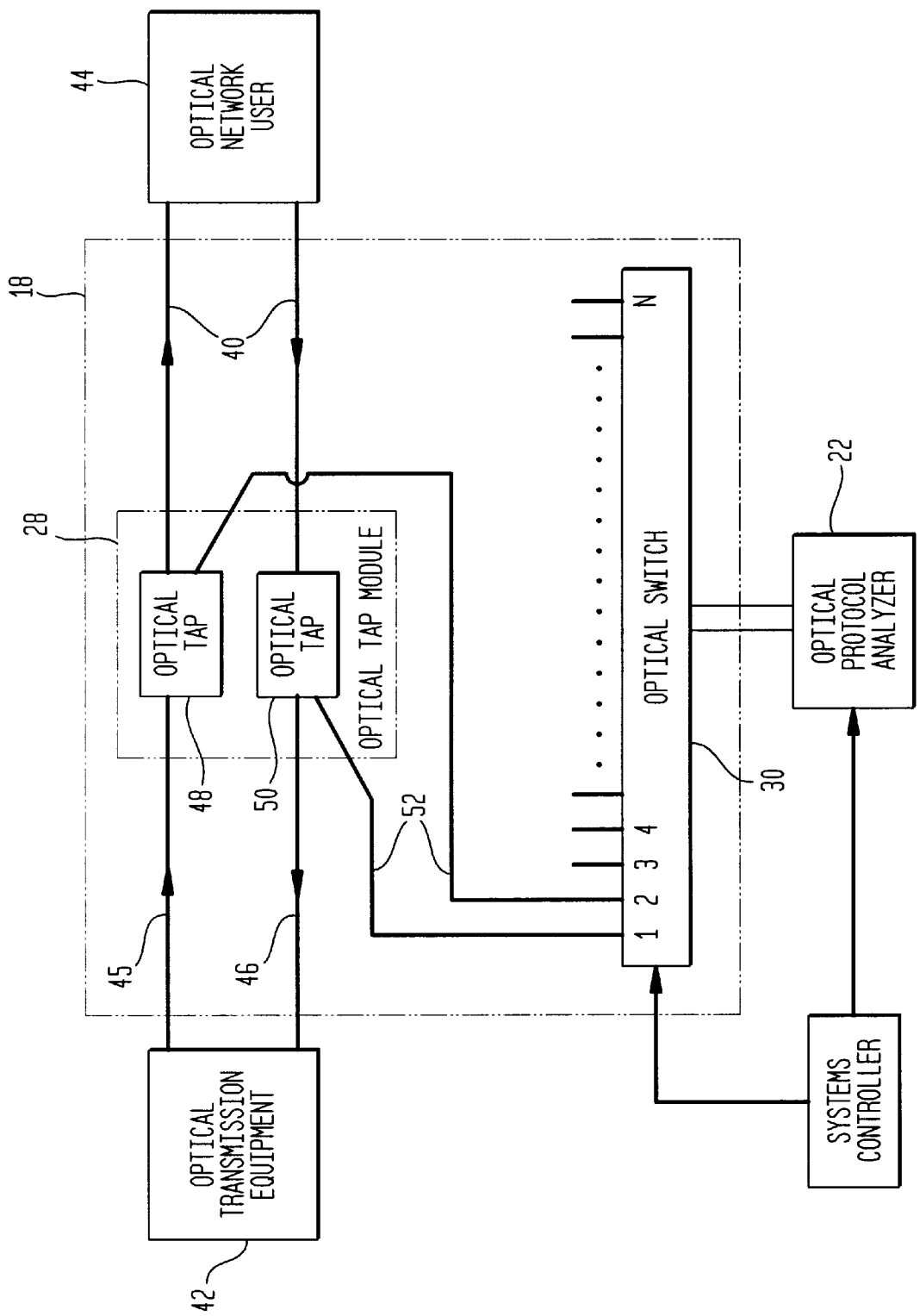
FIG. 3 is a schematic diagram of an exemplary version of the present invention.

Referring to FIG. 3, an exemplary schematic of a test shelf 18 is shown. The shown schematic also shows an optical communication link 40 between optical transmission equipment 42 at the central office and an ONU 44. The communication link 40 contains two optical paths. The first path 45 carries optical signals from the optical transmission equipment 42 at the central office to the ONU 44. The second optical path 46 carries optical signals from the ONU 44 back to the optical transmission equipment 42 at the central office.

An optical tap module 28 is added to each optical communication link. Each optical tap module 28 contains input ports and output ports that enable the optical tap module 28 to be physically added into the pathway of the optical communication link 40.

Two optical taps 48, 50 are contained within each optical tap module 28. The first optical tap module 48 taps optical signals traveling along the first optical path 45 between the optical transmission equipment 42 at the central office and the ONU 44. The second optical tap module 50 taps optical signals traveling along the second optical path 46 between the ONU 44 and the optical transmission equipment 42 at the central office. The optical taps 48, 50 are standard optical communication signal taps known to persons skilled in the art that tap a portion of the transmitted optical signal. In an exemplary embodiment of the present invention, the optical taps utilized may be in the range of between 1% and 15%, although other values may also be utilized. Accordingly, the transmitted optical signals remain substantially unaffected as the proportion of optical signal which is tapped is relatively small.

Each optical tap module 28 contains tap ports that lead to the optical taps. Tap leads 52 interconnect the tap ports to the switch ports of the optical switch 30. The optical switch 30 selectively interconnects the optical protocol analyzer 22 to the various tap leads. Accordingly, the optical switch 30 can direct an optical signal from any of the optical paths to the optical protocol analyzer 22. A single optical protocol analyzer is therefore capable of testing and monitoring numerous optical paths contained within numerous optical communication links without any physical alterations to the overall system and without any disruption to the optical communications links.

The operation of the optical switch 30 and the optical protocol analyzer 22 is controlled by the central controller 20 of the fiber administration system. As such, the optical communication links can be automatically monitored as part of a periodic testing and maintenance routine. Alternatively, specific communication links can be tested and monitored as conditions warrant.

The schematic shown in FIG. 3 shows a single optical switch 30 between the optical protocol analyzer 22 and the optical tap modules 28. The use of a single optical switch is merely exemplary. If a single optical protocol analyzer is being used, and the number of optical tap modules exceeds the capacity of a single optical switch, it will be understood that multiple optical switches can be used to direct any plurality of optical tap modules being selectively connected to the sole optical protocol analyzer. Alternatively, it is desired to reduce testing time or to test multiple communication links simultaneously, a plurality of optical protocol analyzers can be made part of the overall system.

It will be understood that the embodiment of the present invention specifically shown and described is merely exemplary and that a person skilled in the art can make alternate embodiments using different configurations and functionally equivalent components. All such alternate embodiments are intended to be included in the scope of this invention as set forth in the following claims.

What is claimed is:

1. An apparatus for testing optical signals in an optical communications link, said apparatus comprising:
    a plurality of optical taps for tapping the optical signal from each optical communications link;
    at least one optical switch coupled to said plurality of optical taps; and
    at least one optical protocol analyzer coupled to said at least one optical switch, wherein said at least one optical switch selectively connects each optical protocol analyzer to one of said plurality of optical taps.

2. The apparatus according to claim 1, further including a plurality of tap modules, wherein each of said tap modules contains at least two of said plurality of optical taps.

3. The apparatus according to claim 2, further including at least one test shelf for selectively retaining at least some of said plurality of tap modules.

4. The device according to claim 3, wherein an optical switch is disposed within each said test shelf, wherein said optical switch is connected to each of said plurality of optical taps contained within said tap modules on that test shelf.

5. A fiber administration system for establishing optical communication links, via optical fiber pathways between different locations, said system comprising:
    an optical tap disposed in each optical fiber pathway;
    an optical switch coupled to an optical tap in a plurality of different optical fiber pathways;
    an optical signal analyzer coupled to said optical switch, wherein said optical switch selectively interconnects said optical signal analyzer to an optical tap coupled to said optical switch.

6. The system according to claim 5, wherein said fiber administration system includes a frame, at least one bay within said frame and a plurality of shelves in said bays.

7. The system according to claim 6, wherein each said optical tap is contained within a tap module, wherein each tap module is retained in one of said plurality of shelves.

8. The system according to claim 7, wherein two optical taps are disposed within each tap module.

9. The system according to claim 7, wherein a plurality of tap modules are retained in at least some of said plurality of shelves.

10. The system according to claim 9, wherein an optical switch is contained on each of said plurality of shelves that contain a tap module, wherein the optical switch on the shelf is coupled to the optical tap contained within the tap modules on that shelf.

11. The system according to claim 5, wherein said optical signal analyzer is an optical protocol analyzer.

12. The system according to claim 5, further including a programmable controller coupled to said optical switch for selectively causing said optical signal analyzer to receive an optical signal from one of said optical taps.

13. A test shelf assembly for use in an optical fiber administration system, comprising:

a plurality of tap modules, wherein each said tap module is cable of tapping a portion of at least one optical signal passing therethrough;

shelf casing capable of selectively receiving and retaining said plurality of tap modules;

an optical switch positioned within said shelf casing, wherein said optical switch receives the tapped portion of the optical signal produced by each of said plurality of tap modules.

14. The assembly according to claim 13 wherein each tap module contains two optical taps.

15. A method of monitoring optical signals in a plurality of optical communications links, said method comprising the steps of:

tapping a portion of the optical signal from each of the optical communication links;

coupling the tapped portion of each optical signal to an optical switch;

coupling the optical switch to an optical protocol analyzer, wherein said optical protocol analyzer receives the tapped portion of an optical signal directed to it by said optical switch.

16. The method according to claim 15, wherein said step of tapping a portion of the optical signal from each of the optical communication links, includes directing each optical communications link through an optical module, wherein each optical module contains an optical tap for tapping a portion of the optical signal in each direction of travel.

17. The method according to claim 16, wherein said step of tapping a portion of the optical signal includes positioning at least one optical tap in each of said optical communication links.

* * * * *